April 17, 1934.  D. LOW  1,954,822

VARIABLE SPEED MECHANISM

Filed Sept. 5, 1929

WITNESS
C. B. Shillinger

INVENTOR
David Low
BY Munn & Co.
ATTORNEY

Patented Apr. 17, 1934

1,954,822

UNITED STATES PATENT OFFICE 1,954,822

VARIABLE SPEED MECHANISM

David Low, Asheville, N. C.

Application September 5, 1929, Serial No. 390,641

2 Claims. (Cl. 172—239)

My invention relates to improvements in variable speed mechanisms, and it consists in the combinations, constructions and arrangements herein described and claimed.

An object of my invention is to provide an electrically controlled device of this character, having all of its gears constantly in mesh and providing any desired number of speed ratios between a driving and a driven shaft.

A further object is to provide a device of this kind which is simple to control, and which will avoid the common disadvantages of manually operated gear ratio mechanisms.

A further object of my invention is to provide a mechanism of this kind which is adaptable to automobiles, especially heavy trucks, where the changing of the gear ratios ordinarily involves tiresome work.

Another object of my invention is so to arrange the device that it may be entirely operated by electricity, controlled by suitable means.

A specific object is to provide a device which will render nil the possibility of stripped or broken gears.

Other objects and advantages will appear in the following specification, and the novel features of the invention will appear in the appended claims.

My invention is illustrated in the accompanying drawing, forming part of this application, in which:—

Figure 1:
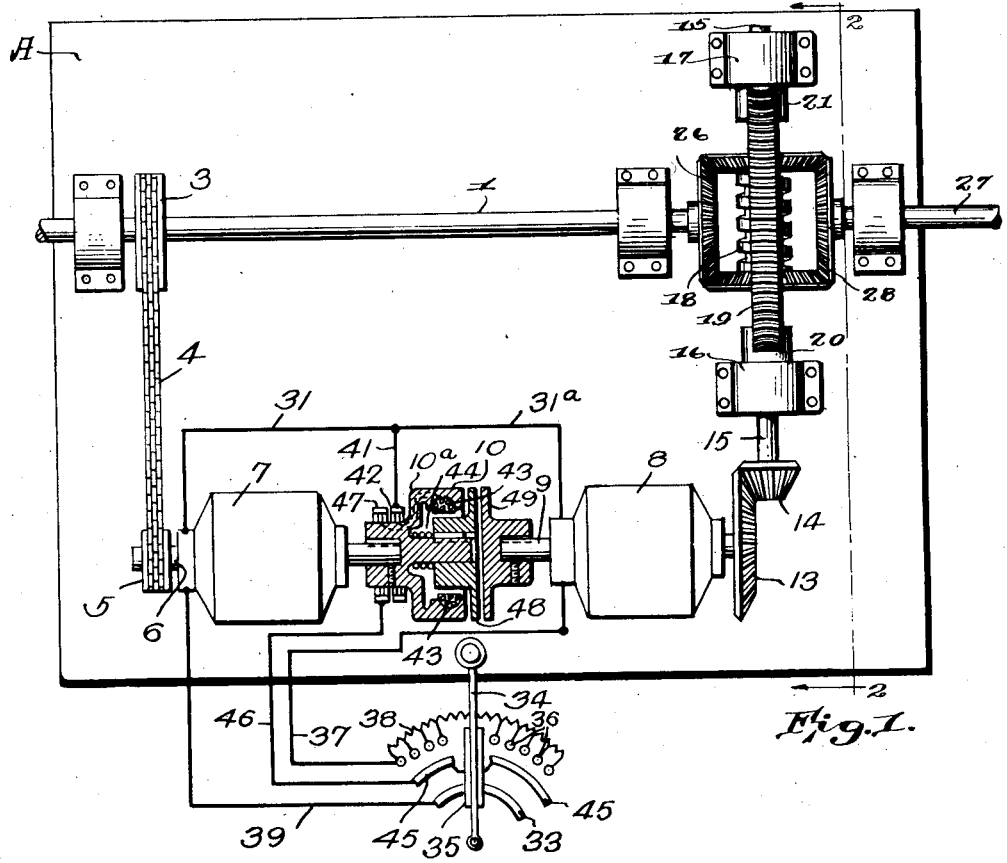
Figure 1 is a plan view of my device.
Figure 2:
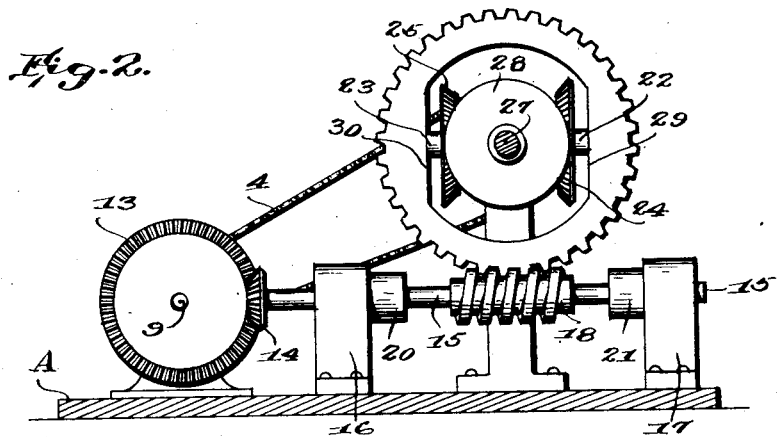
Figure 2 is an elevation taken through line 2—2 of Figure 1.

Referring to the drawing, I have shown therein mounted upon a base A, a driving shaft 1, to which is affixed a sprocket 3, adapted to drive a chain 4, which in turn connects with a sprocket 5 affixed to a shaft 6.

The shaft 6 is adapted to operate an electric generator 7. An electric motor 8 is so placed that its shaft 9 is in alignment with the shaft 6 of the generator, and may be locked with said generator by means of a magnetic clutch 10.

A controller which will be presently described and which includes a rheostat, is suitably connected with the generator 7, the clutch 10 and the motor 8.

To the shaft 9 is attached a bevel-gear 13 which is permanently in mesh with and at a right angle to a beveled pinion gear 14, mounted at one end of a shaft 15.

This shaft 15 is held in position by suitable means, as by the journal-boxes 16 and 17. Carried on said shaft 15 is a worm-gear 18, adapted to drive the worm-wheel 19, and permanently in mesh therewith. Thrust bearings 20 and 21 are affixed to the shaft 15 adjacent to the journal-boxes 16 and 17, respectively.

Carried by the worm-wheel 19, and at diametrically opposed points upon the inner periphery thereof, are shoulders 29 and 30, from which project studs 22 and 23, respectively. Rotatably mounted upon the studs 22 and 23 are the miter-gears 24 and 25, respectively.

Exact counterparts of the gears 24 and 25 are mounted, one upon the end of the shaft 1, as at 26, and the other upon one end of a driven shaft 27, as shown at 28. These four miter-gears 24, 25, 26 and 28 are permanently in mesh, as shown in Figure 1. It will be seen from the above description, that the operation of the device is as follows: The shaft 1 is driven by a source of power (not shown). By means of the permanently meshed gears 24, 25, 26 and 28, the shaft 27 is ordinarily driven at the same rate of speed as the shaft 1, but in a reverse direction.

The magnetic clutch 10 consists of three principal parts, a non-magnetic member 10ª rigidly secured to the shaft 6, a magnetic member 48 keyed for sliding fit on the member 10ª and non-magnetic member 49 rigidly secured to the shaft 9.

A coil 43 carried by the member 10ª has one terminal connected with a ring 42 and the other terminal connected with a ring 47 mounted on the reduced end of the member 10ª. A spring 44 tends to urge the magnetic member 48 towards the member 49 when no current is in the coil 43 so that the shafts 6 and 9 will be revolved together when the member 48 frictionally engages the member 49. When electric current, however, is applied to coil 43 the magnetic pull of this coil overcomes spring 44 and member 48 is pulled away from member 49 so that shafts 6 and 9 are free to revolve independently of each other.

The controller consists of a movable arm 34 formed of insulating material upon which is mounted a contact plate 35. A resistance 38 is located adjacent the movable arm 34 and is provided with a plurality of contact members connected to different points in the resistance which is connected with the motor 8 by a wire 37. The metal contact plate 35 is adapted to engage either of the arcuately-shaped contact members 45 while the plate 35 is in constant engagement with the member 33. The plate 35 is capable of being moved in such positions as will give various electric connections between the plates 33, 45, and the contacts 36. The plate 33 is connected by a wire 39 with one terminal of the generator 7 while contacts 45 which are connected together are connected by a wire 46 with the ring 47 and, therefore, with one terminal of the coil 43. A wire 41 connects the ring 42 with the wire 31 which is connected with one terminal of the generator 7. A wire 31ᵃ connects the wire 31 and likewise the wire 41 with one terminal of the motor 8. Wire 37 connects the other terminal of the motor 8 with the resistance 38.

When the controller arm 34 is in the vertical position, as shown in Fig. 1, no electrical connections are made and, therefore, shafts 7 and 8 revolve at the same speed. The plate 35 does not make contact with either plate 45 or with any of the rheostat contacts 36. Therefore, both clutch and motor circuits are open. The clutch 10 is now under the operation of spring 44 and motor shaft 9 is being driven at the same speed as shaft 6. When the arm 34 is moved one point to the right, the plate 35 closes circuit between contacts 33 and 45 completing the circuit to the coil 43, thereby opening clutch 10 or moving member 48 against the tension of the spring so that the member 48 is no longer in frictional contact with the member 49. The plate 35 closes the circuit between the member 33 and one of the contacts 36 which includes a circuit of the generator 7 and motor 8 through such portion of the resistance 38 that sufficient current will flow into the motor to maintain its speed slightly below that of shaft 6.

As the arm 34 is moved across additional contacts to the right, the clutch circuit remains closed and each contact engaged increases the resistance in the circuit to the motor 8 so that the speed of the motor is proportionately decreased.

At the extreme right hand position of the arm 34 the member 35 continues to make contact between the members 33 and 45 so that the clutch remains open but in this position there is no connection between plate 33 and any of the resistance contacts 36 and the motor circuit is open and the motor comes to a stop. The reverse movement of the arm 34 has the reverse effect of the order just described.

Movement of arm 34 to the left of the vertical position causes contact 35 to connect contact 33 with the left-hand portion of plate 45, causing the clutch to be opened again and also causing the member 35 to make connection between the contact member 33 and the left hand group of resistance contacts 36, thereby again closing the motor circuit by supplying less resistance to the motor so that the motor will have a greater speed at this time than when the arm 34 has been moved to the right.

By means of the sprockets 3 and 5, the chain 4 and the shaft 6, a generator 7 produces electrical energy, which the operator of this mechanism may use at his discretion, using the controller previously described.

If he desires to bring the shaft 27 to a standstill without stopping the power-shaft 1, he merely de-energizes the magnetic clutch 10, which couples the generator shaft 6 and the motor shaft 9, when with the intermeshing bevel gears 13 and 14 in proper ratio, the worm wheel 19 is driven at half speed from the shaft 9 of the motor 8, through the bevel gears aforesaid and the worm 18 in the same direction as the shaft 1.

If, however, the operator desires to impart motion to the shaft 27 at a greater or less speed than, or in a reverse direction to, the shaft 1, he merely varies the speed of the electric motor 8 by means of the controller 11.

If the operator desires the shaft 27 to move at the same speed as, but in an opposite direction to, shaft 1, he merely energizes the clutch 10, and disconnects the motor 8 by means of the controller.

It will be observed that, while this mechanism is peculiarly adapted to use in an automobile transmission, it may nevertheless be used to advantage in regulating the speed ratio between any driving shaft and its respective driven shaft.

While I have shown but one form of this device, it is apparent that many minor changes might be made without changing the scope of the invention, and I therefore do not wish to limit myself to the construction shown herein.

I claim as new and desire to secure by Letters Patent:

1. In a variable speed mechanism a driving shaft and a driven shaft, speed ratio regulating means for said shafts comprising a generator connected to be operated by said driving shaft, a motor, said motor and generator having alined shafts, an electrical circuit between the generator and motor, a resistance in the circuit, a magnetic clutch in circuit with said generator for connecting and disconnecting said motor and generator shafts, means for controlling electrical connections between the generator and motor; for controlling the amount of resistance in the circuit and for connecting or disconnecting the magnetic clutch coil with the generator, a differential connecting said shafts, a worm connected to be driven by said motor, a worm wheel meshing with said worm and connected with said differential to impart motion to the driven shaft at a greater or less speed or in a reverse direction to the driving shaft, all gears being constantly in mesh.

2. In a variable speed mechanism a driving shaft and a driven shaft, a differential connecting said shafts, a worm gear connected with said differential, a worm meshing with said worm gear, a motor connected to drive said worm, a generator connected to be actuated by said driving shaft, a magnetic clutch between said generator and motor, an electrical circuit including a resistor connecting said generator and motor in series, a second circuit connecting the clutch coil across said generator, means in said first circuit for controlling the electrical connections between the generator and motor, for controlling the amount of resistance in the circuit, and to connect or disconnect the magnetic clutch coil with the generator, the pitch of the teeth of the worm and worm gear being such that large resistance is opposed to any effort to turn the worm by force applied to the worm wheel.

DAVID LOW.